United States Patent
Nishima et al.

(10) Patent No.: US 6,715,889 B2
(45) Date of Patent: Apr. 6, 2004

(54) PROJECTION TYPE DISPLAY APPARATUS

(75) Inventors: Ryo Nishima, Yokohama (JP); Morihiko Ota, Moriya (JP)

(73) Assignee: Victor Company of Japan, Limited, Yokohama (JP)

(*) Notice: Subject to any disclaimer, the term of this patent is extended or adjusted under 35 U.S.C. 154(b) by 0 days.

(21) Appl. No.: 10/647,245

(22) Filed: Aug. 26, 2003

(65) Prior Publication Data

US 2004/0041982 A1 Mar. 4, 2004

(30) Foreign Application Priority Data

Aug. 30, 2002 (JP) ................................ P2002-253134
Jun. 18, 2003 (JP) ................................ P2003-173304

(51) Int. Cl.[7] .......................... G03B 3/00; G03B 21/14; G03B 21/20; G03B 21/26; H04N 9/31
(52) U.S. Cl. ................ 353/101; 353/100; 353/102; 353/20; 353/119; 353/122; 359/383; 359/395; 359/831; 348/744; 348/745; 348/825
(58) Field of Search ................ 353/100, 101, 353/102, 20, 33, 119, 122; 359/383, 395, 831; 348/744, 745, 825

(56) References Cited

U.S. PATENT DOCUMENTS 5,537,167 A * 7/1996 Toide et al. ............ 353/100

2002/0015225 A1 * 2/2002 Ue ........................ 359/383

FOREIGN PATENT DOCUMENTS

| JP | 02-095309 | 7/1990 | ........... G02B/7/02 |
| JP | 07-272645 | 10/1992 | ........... H01J/29/89 |
| JP | 08-160276 | 6/1996 | ........... G02B/7/02 |
| JP | 09-090273 | 4/1997 | ........... G02B/27/18 |
| JP | 11-218854 | 8/1999 | ........... G03B/27/46 |

* cited by examiner

Primary Examiner—Russell Adams
Assistant Examiner—Melissa J Koval
(74) Attorney, Agent, or Firm—Nath & Associates PLLC; Gary M. Nath

(57) ABSTRACT

By mounting a projection lens to a first supporting member for fixing spatial light modulators, polarization beam splitters and a cross dichroic prism, and providing a second supporting member having a thermal expansion coefficient larger than that of the first supporting member between the projection lens and the first supporting member, afluctuation of distance between the spatial light modulators and the projection lens due to heat generated by a light source lamp of a projection type display apparatus and temperature change in use environment can be canceled so that an optimum projected image having nothing to do with being out of focus can always be obtained.

2 Claims, 3 Drawing Sheets

PROJECTION TYPE DISPLAY APPARATUS

BACKGROUND OF THE INVENTION

1. Field of the Invention

The present invention relates to a projection type display apparatus.

2. Description of the Related Art

A color projection display apparatus is an apparatus which displays a color image on a screen by color-separating a white light beam into color light beams of R (red), G (green) and B (blue) as three primary colors and guiding the same to spatial light modulators respectively corresponding thereto, color-synthesizing the color light beams, which have been optically modulated by the spatial light modulators of the three primary colors in accordance with video signals, and projecting the same by a projection lens.

As for an optical appliance, it is known that such a problem arises that the focusing performance of a lens to be used deteriorates due to temperature change in use environment.

Furthermore, since a color projection display apparatus uses a high output light source lamp for directing a strong light beam to the optical system, the thermal expansion is brought about in a supporting member for supporting the projection lens according to the temperature rise of the projection display apparatus generated after turning on the power source of the apparatus so that a problem occurs that the focusing performance of the projection lens deteriorates according to the change of a distance between each spatial light modulator and the projection lens with the passage of time.

As a video projector capable of preventing the deterioration of focusing performance of the projection lens caused by the temperature change at the time of operating the projection display apparatus, the Japanese Patent Application Laid Open (JP-A) No.9-90273 discloses a lens focusing device. In a projection type television for enlarging an image displayed on a cathode ray tube (CRT) and then projecting the enlarged image on a screen by a projection lens, a part of the projection lens is provided reciprocally movably in the optical axis direction by a slight amount by optical coupling by filling the space between the projection lens and the CRT with a liquid having a refractive index close to that of the face glass of the CRT and high transparency so that a focusing correction may be executed against temperature drift.

Moreover, the Japanese Patent Application Laid-Open (JP-A) No.8-160276 discloses a lens containing member with a focus correcting function. An optical appliance having a wide range of temperature change of use environment includes a lens barrel fixed on an optical appliance main body having a light receiving member. Furthermore, the optical compliance is provided with another lens barrel that surrounds its housing and supports a lens system for focusing on the light receiving member. The two lens barrels are connected to each other with a connection member having a thermal expansion coefficient larger than that of each lens barrel so that a lens containing member can correct a focus shift due to temperature change.

As mentioned above, since a color projection display apparatus uses a high output light source lamp, there is the following problem peculiar to the configuration of the projection display apparatus. That is, the temperature around the apparatus rises rather due to the internal light source lamp with the passage of time after turning on the power source of the apparatus than the environment temperature change surrounding the apparatus so that it causes the thermal expansion of optical members and a supporting member for supporting a projection lens inside the apparatus, and as a consequence the distance between each spatial light modulator and the projection lens changes with the passage of time so as to provide a main cause of deterioration in focusing performance of the projection lens.

Therefore, it is difficult to correct focusing against the temperature drift in the projection display apparatus by the configuration of including the entire apparatus in the lens containing member as proposed in the above-mentioned Japanese Patent Application Laid-Open (JP-A) No.8-160276, or by the configuration of improving the coupling of the optical members as proposed in the above-mentioned Japanese Patent Application Laid-Open (JP-A) No.9-90273.

SUMMARY OF THE INVENTION

The present invention has been achieved in view of the above-mentioned problems, and accordingly an object thereof is to provide a projection type display apparatus using a high output light source lamp, capable of projecting a high quality image with a constantly optimum focus by canceling a fluctuation of distance between a spatial light modulator and a projection lens due to heat generated by a light source lamp at the time of operating the projection type display apparatus and temperature change in a use environment.

In order to achieve the above-mentioned object, there is provided a projection type display apparatus comprising: a spatial light modulator for optically modulating an input image to obtain an optical image to be projected; a projection lens; an optical member with the spatial light modulator fixed, for guiding the optical image to an incident side of the projection lens; a first supporting member having a first thermal expansion coefficient; and a second supporting member having a second thermal expansion coefficient larger than the first thermal expansion coefficient, wherein the optical member is fixed on a first end part of the first supporting member in a part not to block the optical image emitted from the optical member to the incident side of the projection lens, and the longitudinal direction of the first supporting member with the optical member fixed is provided parallel to the optical axis of the projection lens; a first end part of the second supporting member is fixed to a second end part of the first supporting member, the second end part being disposed at a position facing the first end part; a second end part which is an end part opposite to the first end part of the second supporting member is fixed to an incident side end part of the projection lens, and an optical axis of the projection lens and an axis of a light beam emitted from the optical member are parallel; the second end part of the second supporting member is disposed on an optical member side with respect to the second end part of the first supporting member; and a thermal expansion amount of the first supporting member from the first end part to the second end part thereof offsets a thermal expansion amount of the second supporting member from the first end part to the second end part thereof.

According to a preferable embodiment of the present invention, the lengths L1 and L2 are set to satisfy L1×k1= L2×k2, where L1 is a length from a projection lens side end face of the optical member which emits the optical image to a position at which the second end part of the first supporting member is attached to the first end part of the second supporting member; L2 is a length from a position at which the second end part of the first supporting member is attached to the first end part of the second supporting member, to a position at which the second end part of the second supporting member is fixed to the incident side end part of the projection lens; k1 is the first thermal expansion coefficient; and k2 is the second thermal expansion coefficient.

The nature, principle and utility of the invention will become more apparent from the following detailed description when read in conjunction with the accompanying drawings.

DESCRIPTION OF THE PREFERRED EMBODIMENTS

Hereinafter, with reference to the drawings, embodiments of the projection type display apparatus of the present invention will be explained in detail.

Figure 1A:
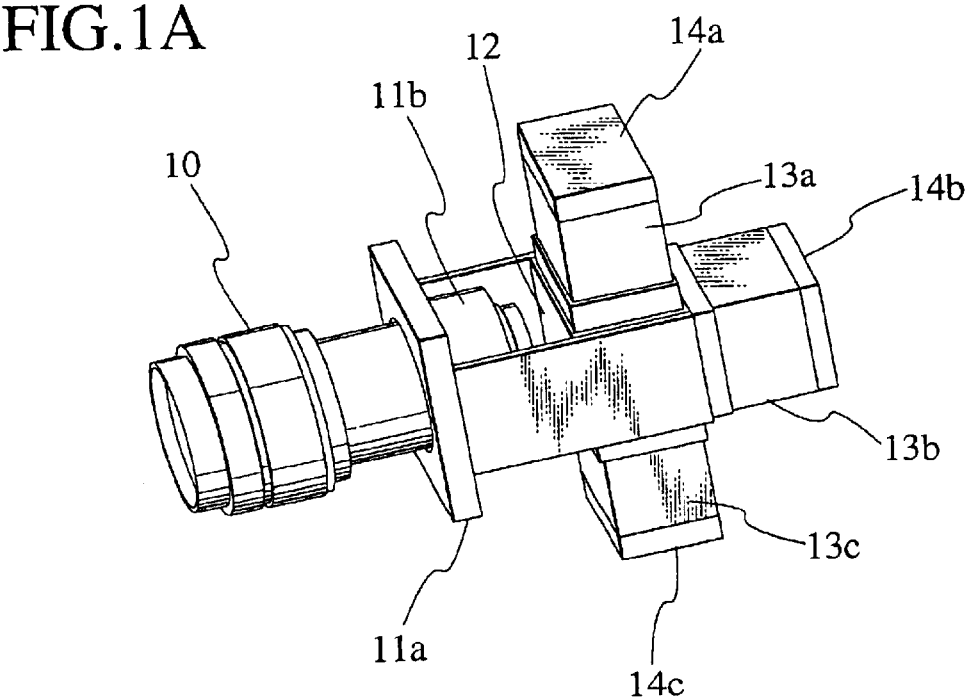
FIG. 1A is a schematic configuration diagram showing an installation example of optical members and a projection lens of a projection type display apparatus used for an embodiment of the present invention.

FIG. 1A shows an installation structure example of a projection lens of a projection type display apparatus used for this embodiment.

To a first end part of a supporting member 11a made of an aluminum alloy, is fixed optical members comprising three polarization beam splitters 13a, 13b, 13c with three RGB reflection type spatial light modulators 14a, 14b, 14c fixed, and a cross dichroic prism 12.

An image signal inputted to the projection type display apparatus is converted to RGB signals by an unshown known signal processing circuit so as to be supplied to the reflection type spatial light modulators 14a, 14b, 14c. On the other hand, a white light beam from an unshown light source is separated into the RGB colors by a known color separation system optical block so as to be supplied to the reflection type spatial light modulators 14a, 14b, 14c. The RGB color light beams modulated according to the input image signal by the reflection type spatial light modulators 14a, 14b, 14c are supplied to the cross dichroic prism 12 through the polarization beam splitters 13a, 13b, 13c, respectively. At the cross dichroic prism 12, the modulated RGB color light beams are synthesized to generate a projection image light beam. This generated projection image light beam is emitted on a projection lens 10 along the emitted light beam axis 12a.

Although the configuration of separating the white light beam from the light source into the RGB, and using three pieces of the reflection type spatial light modulators according to the RGB colors is explained in this embodiment, a projection type display apparatus having a single plate configuration may be used as well.

Figure 1B:
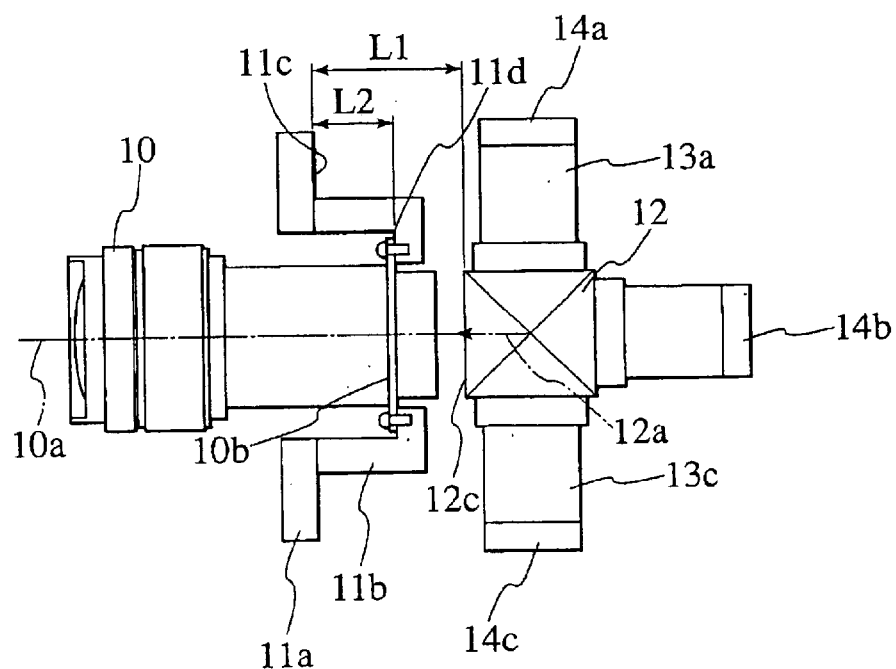
FIG. 1B is across-sectional view thereof.

Moreover, in the embodiment shown in FIGS. 1A and 1B, the emitted light beam axis 12a and the optical axis 10a of the projection lens 10 coincide with each other. However, since a projection image may be corrected by shifting the projection lens 10 depending on the installation state of the projection type display apparatus, in this case the emitted light beam axis 12a and the optical axis 10a of the projection lens 10 are provided so as to maintain at least parallel with each other.

FIG. 1B is a cross-sectional view of FIG. 1A. A first end part of a resin supporting member 11b is fixed to a second end part of the supporting member 11a. The incident side end part 10b of the projection lens 10 is fixed to the second end part of the supporting member 11b from the front side of the projection type display apparatus such that the optical axis 10a of the projection lens and the emitted light beam axis 12a becomes to be parallel.

In this case, the focus of the image projected on the screen is determined by the distance from the reflection type spatial light modulators 14a, 14b, 14c to the screen and the focal distance of the projection lens 10, and since the relationship between the distances changes according to temperature change, this undesirably causes being out of focus. It is known that the thermal expansion coefficient of a glass as an optical member is sufficiently smaller than that of an aluminum alloy or a polycarbonate resin. Therefore, in the projection type display apparatus of the above-mentioned configuration, by making constant, regardless of the temperature change of the projection type display apparatus, the distance between the projection lens 10 and the projection lens side end face 12c of the cross dichroic prism 12 serving as the final constituent part on the optical path of the projected light beam with respect to the projection lens 10, a constant point of focus of the projected image can be obtained. Specifically, by arranging members such that the thermal expansion amount from the first end part to the second end part of the supporting member 11a offsets the thermal expansion amount from the first end part to the second end part of the supporting member 11b, the constant point of focus of the projected image can be obtained.

Therefore, in the above-mentioned configuration, lengths L1 and L2 are set to satisfy the relationship $L1 \times k1 = L2 \times k2$, where L1 is the length from the projection lens side end face 12c of the optical members to the position 11c at which the second end part of the supporting member 11a is attached to the first end part of the supporting member 11b; L2 is the length from the position 11c at which the second end part of the supporting member 11a is attached to the first end part of the supporting member 11b, to the projection lens mounting surface lid; k1 is the thermal expansion coefficient of the aluminum alloy of the supporting member 11a: and k2 is the thermal expansion coefficient of the resin of the supporting member 11b. Accordingly, the distance between the optical members and the projection lens does not change when the supporting member 11a expands due to heat by $L1 \times k1$ while the supporting member 11b expands by $L2 \times k2$. For this reason, the constant point of focus of the projected image can be obtained.

Figure 2A:
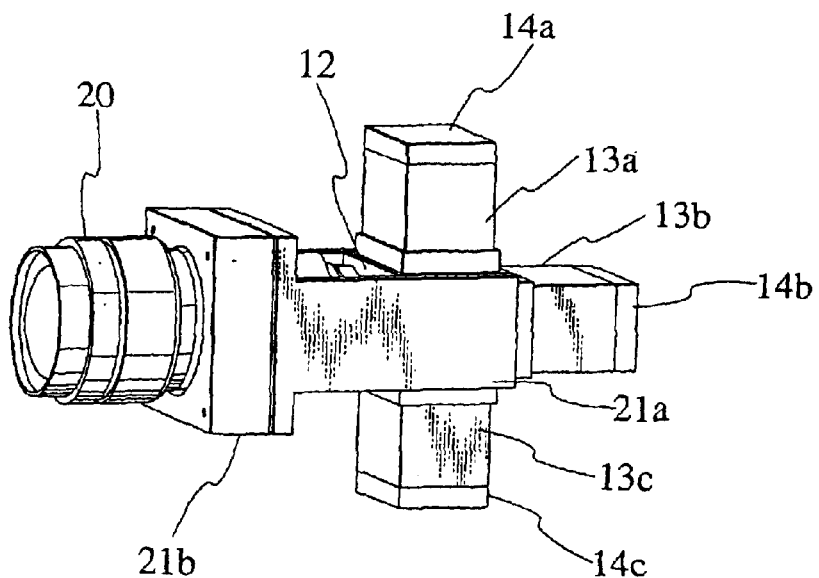
FIG. 2A is a schematic configuration diagram showing an installation example of optical members and a projection lens of a projection type display apparatus used for another embodiment of the present invention.
Figure 2B:
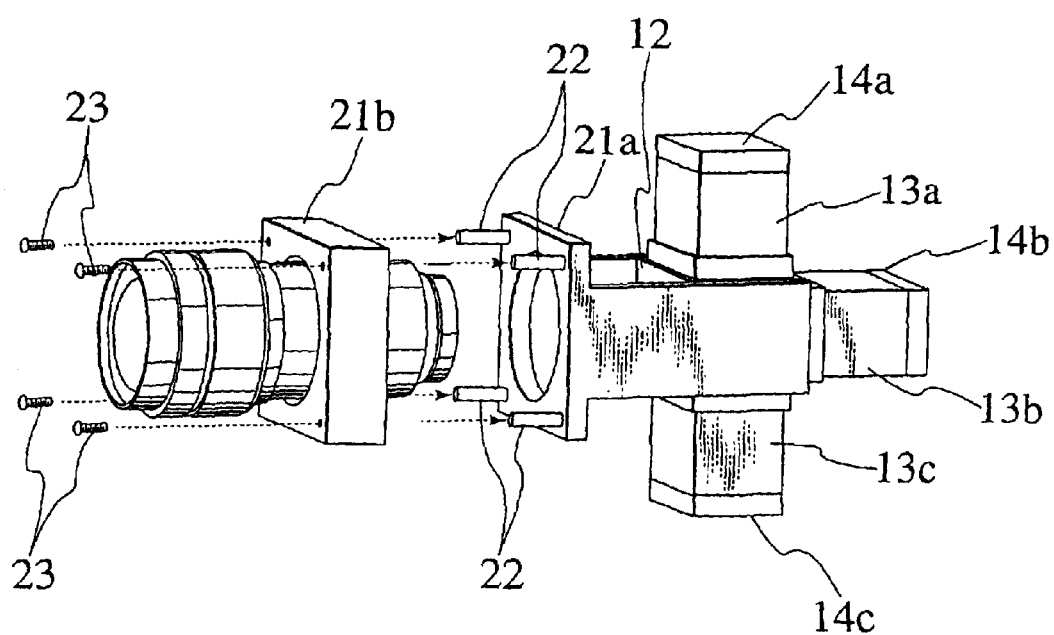
FIG. 2B is an assembly diagram thereof.
Figure 2C:
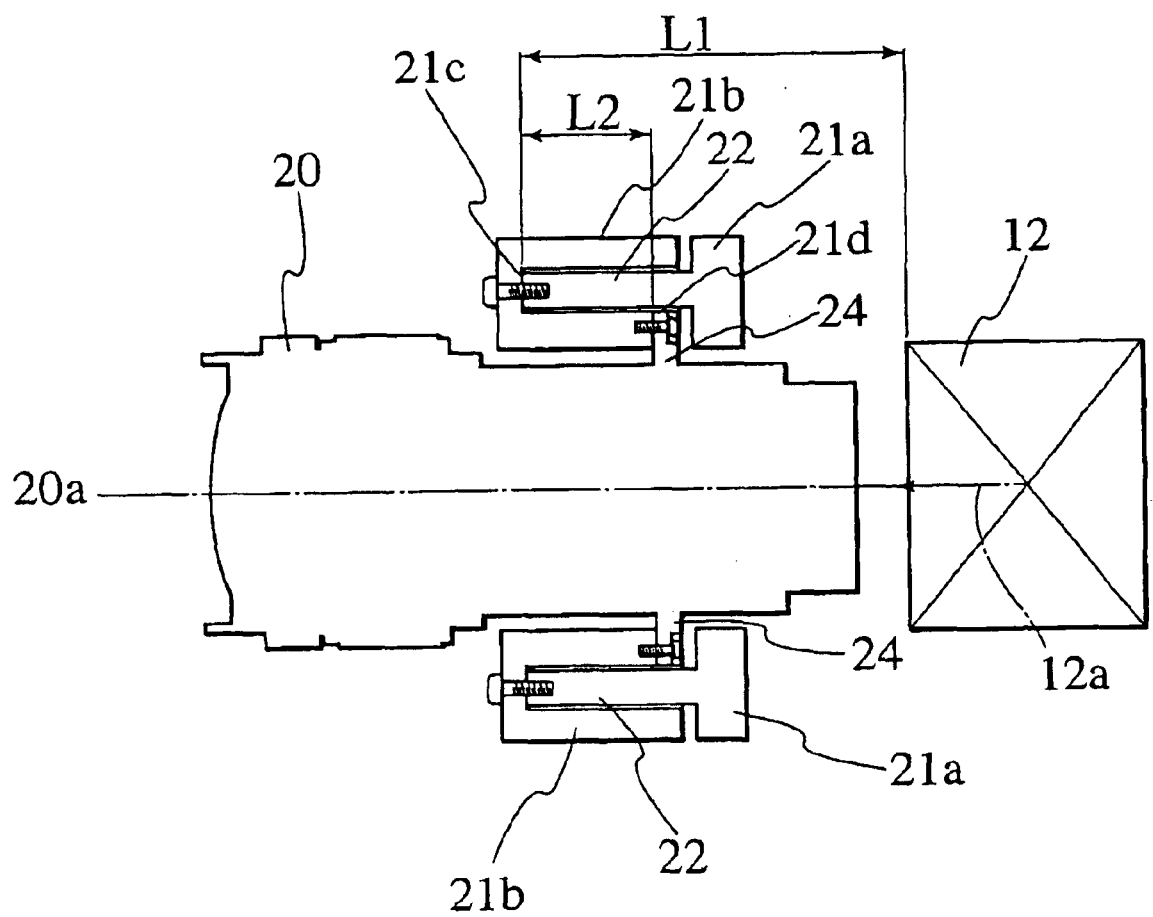
FIG. 2C is across-sectional view thereof.

Next, with reference to FIGS. 2A to 2C, another embodiment will be explained. FIG. 2A is a schematic configuration diagram of installation of optical members and a projection lens. FIG. 2B is an assembly diagram thereof. FIG. 2C is a cross-sectional view thereof. The optical path of the projected image is same as in the above-mentioned embodiment.

Optical members are fixed to a first end part of a supporting member 21a, and a second end part of the supporting member 21a is provided with four projections 22 on the end face opposite to the optical members side. A supporting member 21b is provided with holes through which all the projections 22 are inserted such that the top ends of the projections 22 are fixed on a first end face farther from the optical members, of the supporting member 21b by screws 23 tightened from the opposite side with respect to the optical members.

The projection lens 20 is provided with a flange 24. The second end face of the supporting member 21b is attached on an opposite side face with respect to the optical members, of the flange 24. Then, the supporting member 21b is fixed to the flange 24 by screws tightened from the optical members side.

According to the configuration explained so far, all the parts are fixed with the parallel state of the optical axis 20a of the projection lens 20 and the emitted light beam axis 12a of the cross dichroic prism 12 maintained.

Assuming that the length from the projection lens side end face 12c of the cross dichroic prism 12 serving as the final constituent part on the optical path of the projected light beam with respect to the projection lens 20, to the top ends of the projections 22 is L1, and the length from the top ends of the projections 22 to the flange 24 on which the projection lens 20 is mounted is L2. It is same as in the above-mentioned embodiment that the constant point of focus of the projected image can be obtained without the distance change between the optical members and the projection lens because the supporting member 21a expands due to heat by L1×k1 while the supporting member 21b expands by L2×k2 to satisfy the relationship L1×k1=L2×k2, k1 is the thermal expansion coefficient of the aluminum alloy of the supporting member 21a; and k2 is the thermal expansion coefficient of the resin of the supporting member 21b.

In the case the thermal expansion coefficient of the optical members comprising the polarization beam splitters and the cross dichroic prism bonded therewith is too large to be ignored, such a configuration may be employed that the total sum of the thermal expansion value of the optical members from the spatial light modulators to the projection lens and the thermal expansion value of the above-mentioned length L1 from the optical member fixing position to the top ends of the projections 22 can be offset by the thermal expansion value of the length L2 from the top ends of the projections 22 to the mounting flange 24 on which the projection lens 20 is mounted.

As to the supporting members for the optical members and the projection lens used in the embodiments, they are preferably made of a material having a high rigidity and a low thermal expansion. Furthermore, in consideration of the light weight and productivity at the time of production, an aluminum alloy is used. However, the aluminum alloy has a nature that stress concentration easily occurs therein and accordingly it is cracked. The point at which the cracking can easily be generated is called a hard spot.

In order to prevent generation of the hard spot and to improve the casting property, in the embodiments, an aluminum alloy comprising 3% of Cu, 11% of Si, 0.23% of Mg, 0.5% of Zn, 0.75% of Fe, 0.25% of Mn, 0.2% of Ni, 0.1% of Sn, 0.1% of Cr, 0.008% of Ca, 0.1% of Ti, and the remainder Al and having a $24 \times 10^{-6}$ linear thermal expansion coefficient is used.

As to the polycarbonate resin used in the embodiments, one having an enough strength for the chassis and against warping is suitable for supporting the projection lens, and one having 30% of a glass filled, of a $53 \times 10^{-6}$ linear thermal expansion coefficient is used.

In addition to the polycarbonate resin, a polyacetal resin, an ABS resin, a methacrylic resin, and those resins with a glass filled may be used as well, and one having about a 40 to $80 \times 10^{-6}$ linear thermal expansion coefficient is suitable.

Although the projection type display apparatus using reflection type spatial light modulators is explained in the embodiments, the spatial light modulators to be used may be transmission type spatial light modulators, or a DMD (Digital Mirror Device).

In the embodiments, as the use state of the projection type display apparatus, various cases with the use state differ for one projection type display apparatus such as projection from the rear side of the audience to a screen with a considerable distance above the heads of the audience as in a movie theater, projection from immediately behind the screen as a large size television are considered. Therefore, in consideration of the need of providing a plurality of projection lenses of different focal distances so as to be replaced depending on the use state, the servicing property and the assembly easiness, the projection lens is mounted onto a preliminarily provided projection lens supporting mechanism from the front surface of the projection type display apparatus toward the spatial light modulators while keeping their optical axes parallel.

In the case of an apparatus without the need of replacing the projection lens such as a rear projection type display apparatus, the projection lens mounting direction may be any direction.

As heretofore explained in detail, according to the present invention, a projection type display apparatus is provided capable of satisfying the mechanism peculiar to the projection type display apparatus using a high output light source lamp in the apparatus, and being influenced by the temperature change after turning on the power source of the apparatus or the circumferential environment temperature to always obtain an optimum projected image having nothing to do with being out of focus.

It should be understood that many modifications and adaptations of the invention will become apparent to those skilled in the art and it is intended to encompass such obvious modifications and changes in the scope of the claims appended hereto.

What is claimed is:

1. A projection type display apparatus comprising:
   a spatial light modulator for optically modulating an input image to obtain an optical image to be projected;
   a projection lens;
   an optical member with the spatial light modulator fixed, for guiding the optical image to an incident side of the projection lens;
   a first supporting member having a first thermal expansion coefficient; and
   a second supporting member having a second thermal expansion coefficient larger than the first thermal expansion coefficient,
   wherein the optical member is fixed on a first end part of the first supporting member in a part not to block the optical image emitted from the optical member to the incident side of the projection lens, and the longitudinal direction of the first supporting member with the optical member fixed is provided parallel to the optical axis of the projection lens,
   a first end part of the second supporting member is fixed to a second end part of the first supporting member, the second end part being disposed at a position facing the first end part,
   a second end part which is an end part opposite to the first end part of the second supporting member is fixed to an incident side end part of the projection lens, and an optical axis of the projection lens and an axis of a light beam emitted from the optical member are parallel, the second end part of the second supporting member is disposed on an optical member side with respect to the second end part of the first supporting member, and a thermal expansion amount of the first supporting member from the first end part to the second end part thereof offsets a thermal expansion amount of the second supporting member from the first end part to the second end part thereof.

2. The projection type display apparatus according to claim 1, wherein the lengths L1 and L2 are set to satisfy L1×k1=L2×k2, where L1 is a length from a projection lens side end face of the optical member which emits the optical image to a position at which the second end part of the first supporting member is attached to the first end part of the second supporting member; L2 is a length from a position at which the second end part of the first supporting member is attached to the first end part of the second supporting member, to a position at which the second end part of the second supporting member is fixed to the incident side end part of the projection lens; k1 is the first thermal expansion coefficient; and k2 is the second thermal expansion coefficient.

* * * * *